Jan. 1, 1963    G. YOUNG    3,071,527
NUCLEAR REACTOR
Filed March 19, 1957

INVENTOR
GALE YOUNG
BY
ATTORNEYS

United States Patent Office 3,071,527
Patented Jan. 1, 1963

3,071,527
NUCLEAR REACTOR
Gale Young, Hawthorne, N.Y., assignor, by mesne assignments, to the United States of America as represented by the United States Atomic Energy Commission
Filed Mar. 19, 1957, Ser. No. 647,137
2 Claims. (Cl. 204—193.2)

This invention relates to the production of energy from nuclear fission reactions and more particularly to a power-producing nuclear reactor in which the moderator is a fluid compound of deuterium and the fissionable fuel is cooled by a liquefiable metal.

At present, the main emphasis in the development of power-producing reactors is placed on that type which utilizes fluids having a very high vapor pressure at the reactor operating temperatures. This necessitates a large vessel capable of withstanding high pressure for completely enclosing that part of the reactor in which the fluids are located.

I have determined that power may be produced as economically, if not more so, by a reactor which does not require such a pressure vessel, even though the reactor must operate at temperatures capable of producing steam superheated to temperatures required by modern turbines. Moreover, I have found that this can be done with relatively inexpensive fuels such as natural or only slightly enriched uranium. This last feature is made possible by my invention of a reactor which can use fluid compounds of deuterium, e.g., heavy water, as a moderator even though parts of the reactor operate at temperatures which are many times the boiling temperature of such fluids under atmospheric pressure.

The value of heavy water as a moderator in nuclear reactors has long been recognized. The ability of deuterium to slow down neutrons is not up to that of the hydrogen in ordinary water, but this is offset by the much lesser tendency of deuterium to capture slow neutrons. Consequently, the overall performance of heavy water, as measured by its moderating-to-capture ratio, is greatly superior to that of ordinary water. In fact, this superiority makes it possible to build critical, i.e., self-sustaining, reactors utilizing natural uranium or only slightly enriched uranium as fuel, whereas it is impossible to operate similar reactors employing ordinary water as a moderator.

The good moderating power of heavy water makes it superior to many other commonly used moderating substances and it has additional desirable characteristics as well. For example, the volume ratio of moderator to uranium fuel may be made relatively small for a critical reactor. Moreover, the effectiveness of heavy water allows the use of less fuel than would be possible with less effective moderators. It follows that the money investment in uranium may be kept to a minimum and the necessary thermal and biological shields which must surround the core may be made smaller and less expensive. Despite these attractive advantages, however, there is one considerable disadvantage. Reactors that are designed for power production must operate at relatively high temperatures, and since the vapor pressure of water is high at such temperatures, the use of water as a coolant necessitates pressurizing at least a portion of the system. While a pressurized reactor is feasible, it necessarily requires a complex and expensive structure.

I have invented a reactor which utilizes a novel combination of moderator and coolant substances in a structure which overcomes this difficulty. I use a fluid compound of deuterium such as heavy water as the moderator and I use as a coolant a fluid that has a low vapor pressure at high temperatures. This coolant fluid must possess excellent heat transfer properties in order to retain the advantages that accrue from a small reactor volume. Therefore, for this coolant I employ a metal, such as sodium or lead, which is liquefiable at reactor operating temperatures and which has a low vapor pressure at such temperatures, high specific heat and good thermal conductivity as well as low probability of neutron capture. A material having these properties can function very well to carry off at a high rate heat produced in the fuel rods.

According to my invention a container for the fuel elements is located in a tank which contains the fluid moderator. In order to shield or insulate the heavy water which has a low boiling temperature, from the high temperature coolant, at least that portion of the conduit which is immersed in the moderator is provided with a jacket which is spaced from and substantially surrounds the conduit. This space between the jacket and the conduit acts as a thermal barrier to the transfer of heat from the coolant fluid to the moderator. According to one aspect of my invention a gas may be circulated through the space between the jacket and the container to carry away heat which is conducted through the container wall. Further, means may be provided for cooling the deuterium moderator. This may be accomplished either by circulating the moderator to an external heat exchanger or heat exchanger coils may be immersed directly into the moderator. Reactors according to this concept may be adapted to produce energy economically over a broad power range.

In the following specification I describe in detail one embodiment of my invention. In the course of the description reference is made to the accompanying drawing, in which.

Figure 1:
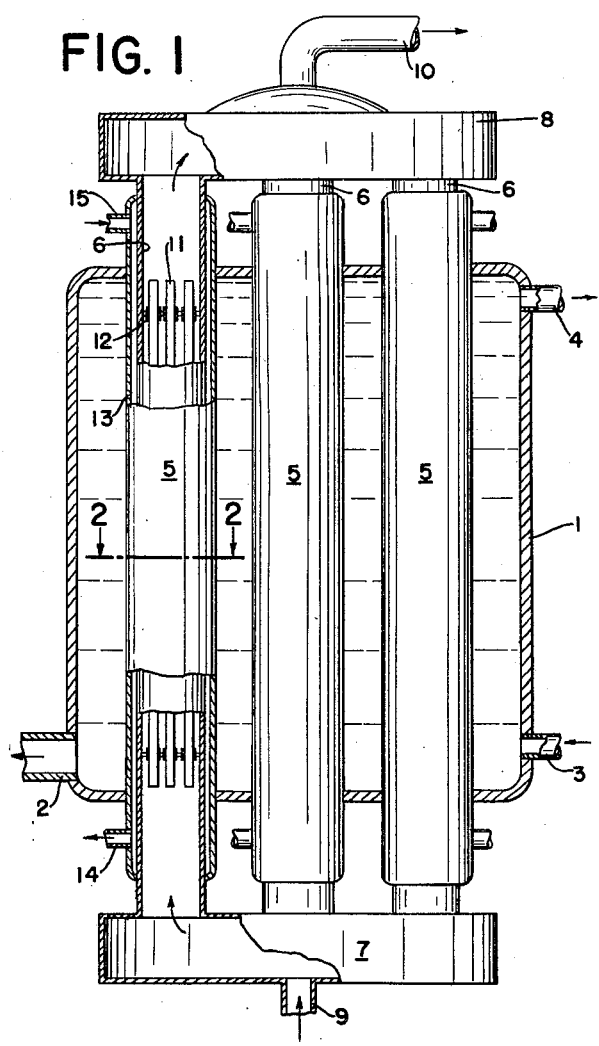
FIG. 1 is an elevation, partly in section, of a liquid-metal cooled, heavy water moderated nuclear reactor.

In FIG. 1, the numeral 1 indicates a container or tank for heavy water or other fluid compound of deuterium. As previously stated, one of the main features of my invention is that the reactor does not utilize high temperature fluids which also have high vapor pressures. Therefore, this tank 1 need only be strong enough to contain the heavy water at a pressure substantially less than would be necessary if the water were used as a coolant or were permitted to be in close contact with the coolant. This may be in the vicinity of atmospheric pressure. In fact, the tank may be open to the atmosphere, but is preferably closed. It may be made of various steels or aluminum.

The tank is provided with a drain 2 which may be used for control purposes as will be described below. I also provide pipes 3 and 4 which open into the tank and are used for normal circulation of the heavy water to an external heat exchanger. By this means the moderator is maintained at a relatively uniform temperature.

The embodiment of my invention shown in FIG. 1 is provided with fuel element assemblies through which the coolant and primary working fluid flows in one direction over and around the uranium fuel elements which are in the form of elongated rods in this embodiment. A plurality of such fuel assemblies is generally indicated at 5 and each comprises a conduit 6 running vertically through the tank 1. Suitable materials for these conduits are zirconium and stainless steel. The lower ends of the conduits which extend through the bottom of the tank are connected to an inlet manifold 7 and the upper ends of the conduits which extend through the top of the tank are connected to an outlet manifold 8. The manifold 7 has an inlet connection 9 which leads from an external heat exchanger of any suitable type for transferring heat to a secondary working fluid which drives a turbine, for example. Similarly, the manifold 8 has an outlet connection 10 which leads to the same external heat exchanger.

Figure 2:
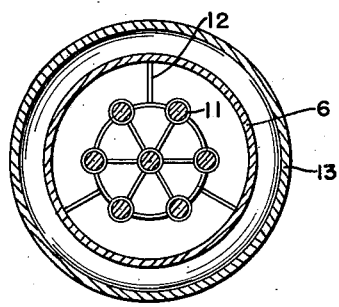
FIG. 2 is a sectional view taken along the line 2—2 of FIG. 1.

A plurality of fuel elements or rods 11 are suspended in spaced relation within each conduit 6 by suitable spiders 12 in substantially the arrangement shown in FIG. 2. In this embodiment, the material of these rods is uranium slightly enriched in the isotope uranium 235. Some types of fuel materials may require that the rods be clad in a thin coating or tube of a metal, such as zirconium or stainless steel, which can withstand the high temperatures and corrosive reaction with the coolant fluid during the operation of the reactor. Such cladding will also provide structural support for the fuel rod material as it tends to disintegrate under the high temperatures and degenerative reactions of the fission process.

To provide thermal isolation of the moderator from the high temperature coolant fluid I provide a metallic jacket 13 which substantially surrounds and is spaced from the conduit 6. As shown in the drawing, the jacket extends through the walls of the tank 1 to the outside of the tank. By extending the jacket beyond the tank, thermal radiation from the section of the conduits containing the fuel rods to the moderator tank is minimized.

In this particular embodiment provisions are made for circulating an inert gas, such as argon or helium, through the space between the conduit 6 and the jacket 13. For this purpose I provide pipes 14 and 15 which open into the jacket and which are connected to the inlet and outlet, respectively, of an external heat exchanger for cooling the gas before it is recirculated.

Figure 3:
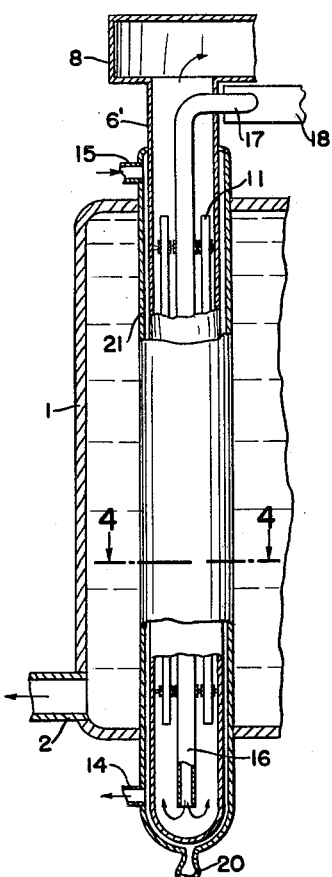
FIG. 3 is a modification of the fuel assembly shown in FIG. 1.
Figure 4:
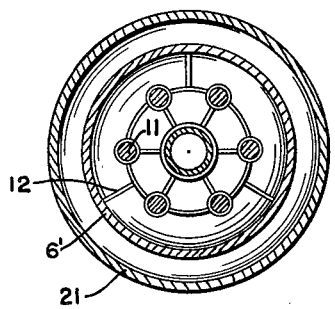
FIG. 4 is a sectional view taken along the line 4—4 of FIG. 3.

FIGS. 3 and 4 show a modified embodiment of the fuel element assembly which may be used in a nuclear reactor according to our invention. This fuel element assembly may be described as a bayonet type and it comprises an outer conduit 6' similar to the conduit 6 disclosed in connection with FIG. 1. However, the conduit 6' is closed at its lower end and is provided with a central conduit 16 which opens into the outer conduit at its lower end and is connected at its upper end to an inlet pipe 17 which is, in turn, connected to an inlet manifold 18. The latter is shown partly broken away in FIG. 3. The upper end of the outer conduit 6' is connected to an outlet manifold 8 as in the case of FIG. 2.

In this modification the liquid sodium or other metal coolant comes in through the manifold 18 and pipe 17 and flows past the fuel rods 11 through the central conduit 16. At the lower end of the conduit 16 the coolant enters the outer conduit 6' and then returns to the outlet at the top of the outer conduit, once again circulating past the fuel rods. The spiders 12 serve to support the fuel rods in spaced relation with the conduit 6' and they also support the central conduit 16 as best seen in FIG. 4.

A relatively simple apparatus may be employed for detection of leaks in a reactor of this kind. In the modification shown in FIG. 3, for example, a bulb 20 may be placed at the bottom of an outer jacket 21. Any liquid sodium leaking through the outer conduit 6' will flow to the bottom of the jacket and be received into the bulb. Its presence may be easily detected there.

Other means of detecting leaks are provided by applying a moderate pressure to the gas circulated through the space between the jacket 13 and the outer conduit 6 (FIGS. 1 and 2) or between the jacket 21 and the outer conduit 6' (FIGS. 3 and 4). In the event of a leak in either the jacket or the conduit the gas will then pass into the deuterium or the sodium. The circuits through which these fluids normally circulate may be monitored by spectrographic analysis or otherwise for the presence of gas. By this means leaks may be detected as soon as they occur and suitable steps maybe taken to prevent further leaks from developing. It will be readily understood by those familiar with elementary chemistry that every precaution should be taken to prevent the water moderator from coming into contact with the metal coolant.

I have now described in detail one particular embodiment of my invention. It is apparent that a reactor using the combination of a liquefiable metal coolant and a heavy water moderator affords outstanding advantages. Of great importance is the ability of our new reactor to operate on a fuel consisting of natural uranium or of natural uranium which is slightly enriched in the isotope, uranium 235. Moreover, the fuel elements will have a long useful life and burn a large fraction of the contained uranium 235. This results in significant economies because the spent fuel elements may be discarded without reprocessing. Of course, a reactor of this kind is not limited to these two fuels. Other fissionable materials such as alloys of uranium and zirconium or molybdenum, stable uranium compounds, plutonium, and thorium may be used.

Utilizing my fundamental concept it is possible to construct reactors having a broad range of power levels and the construction of any reactor of this kind is greatly simplified because no pressure vessel is required, thus eliminating the need for complex seals at the points where control members and piping enter the reactor vessel or tank. The low pressures maintained throughout the reactor also permit the use of relatively thin walls in all of the components of the reactor itself as well as in the heat exchangers.

Stability of my new reactor is excellent and it is exceptionally safe. Control of the rate at which the reaction proceeds may be simply effected by raising and lowering the level of the moderator within the tank 1. This follows because there are not sufficient neutrons to sustain the chain reaction in that portion of the fuel element assembly not surrounded by a moderator. When the moderator level is down the neutrons required to sustain the reaction leak off into the reactor shield instead. An additional inherent control is derived from the fact that as the power level tends to become excessive in a reactor of given design the density of the moderator naturally decreases which decreases the moderator's ability to slow down the neutrons. This provides an automatic stabilization of the power level. In the event of need to shut down the reactor entirely, it may be done very rapidly simply by draining the moderator out through the drain 2 provided in the bottom of the tank 1.

Many variations of the details of the reactor described above are possible. Therefore, my invention is defined by the following claims and is not limited to the details disclosed.

I claim:
1. A neutronic reactor in which heavy water is used as a moderator and a liquid metal is used as a coolant, said reactor comprising a vessel for containing the heavy water moderator, a tubular outer conduit extending through the top and bottom walls of the vessel, the conduit being closed at the lower end and having an outlet at the upper end, a tubular inner conduit concentrically disposed within the outer conduit in spaced relation thereto having an inlet end entering through the outer conduit near the upper end thereof and an outlet adjacent to the lower end of the outer conduit, a plurality of fuel rods containing fissionable material supported in uniform spaced relation between said inner and outer conduits, an insulating jacket spaced from and concentrically surrounding that portion of the outer conduit within the vessel and the lower end thereof, means for circulating liquid metal coolant through the conduits whereby said coolant enters through the inlet end of the inner conduit, flows downwardly past the fuel rods and through the outlet of the inner conduit into the lower end of the outer conduit, thence upwardly over the fuel rods and out through the upper end of the outer conduit, means for circulating an inert coolant gas through the space between the insulating jacket and outer conduit, and a bulb located at the lower end of the insulating jacket having an opening at its upper end connected to the interior of the jacket, so that any coolant or moderator which may leak through the outer conduit or inner conduit respectively will flow into the bulb where it can readily be detected.

2. A neutronic reactor according to claim 1 characterized in that the liquid metal coolant is sodium, the inert gas is argon, the material of the conduits is zirconium, and the fuel rod material consists of uranium enriched in isotope $U_{235}$.

References Cited in the file of this patent

UNITED STATES PATENTS

| | | |
|---|---|---|
| 2,658,728 | Evans | Nov. 10, 1953 |
| 2,832,733 | Szilard | Apr. 29, 1958 |
| 2,898,280 | Schultz | Aug. 4, 1959 |
| 2,902,422 | Hutter | Sept. 1, 1959 |
| 2,915,446 | Liljeblad | Dec. 1, 1959 |

FOREIGN PATENTS

| | | |
|---|---|---|
| 1,119,029 | France | Mar. 26, 1956 |
| 754,183 | Great Britain | Aug. 1, 1956 |
| 753,130 | Great Britain | July 18, 1956 |

OTHER REFERENCES

International Conference on the Peaceful Uses of Atomic Energy, vol. 2, pp. 345, 444, August 1955, U.N. Publishers, New York; vol. 3, pp. 295–321.

Barnes et al.: "International Conference on the Peaceful Uses of Atomic Energy," vol. 3, pp. 330–344, August 1955.

Miller: "Nucleonics," vol. 11, July 1953, pp. 27–31.